US011770436B2

(12) United States Patent
Rowe et al.

(10) Patent No.: US 11,770,436 B2
(45) Date of Patent: Sep. 26, 2023

(54) WEB CLIENT WITH RESPONSE LATENCY AWARENESS

(71) Applicant: Citrix Systems, Inc., Fort Lauderdale, FL (US)

(72) Inventors: Bradley Markus Rowe, Boca Raton, FL (US); Javier Alejandro Figueroa, Davie, FL (US); Jose Daniel Inclan Llanes, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 54 days.

(21) Appl. No.: 17/316,227

(22) Filed: May 10, 2021

(65) Prior Publication Data

US 2022/0086215 A1    Mar. 17, 2022

Related U.S. Application Data

(60) Provisional application No. 63/058,182, filed on Jul. 29, 2020.

(51) Int. Cl.
*H04L 67/02* (2022.01)
*G06F 9/455* (2018.01)
*H04L 43/0864* (2022.01)

(52) U.S. Cl.
CPC .......... *H04L 67/02* (2013.01); *G06F 9/45558* (2013.01); *H04L 43/0864* (2013.01); *G06F 2009/45562* (2013.01)

(58) Field of Classification Search
CPC .. H04L 43/0864; H04L 67/02; G06F 9/45558
See application file for complete search history.

(56) References Cited

U.S. PATENT DOCUMENTS

| 5,654,839 | A | * | 8/1997 | Tanaka | G11B 20/18 |
| 6,078,956 | A | * | 6/2000 | Bryant | H04L 67/1091 709/227 |
| 2006/0235961 | A1 | * | 10/2006 | Klein | H04L 67/025 709/224 |
| 2007/0006032 | A1 | | 1/2007 | Sun | |
| 2007/0006070 | A1 | * | 1/2007 | Baartman | G06F 16/958 715/234 |
| 2008/0250128 | A1 | * | 10/2008 | Sargent | H04L 43/106 709/223 |
| 2009/0222555 | A1 | | 9/2009 | Qian et al. | |

(Continued)

OTHER PUBLICATIONS

Oct. 22, 2021—PCT International Searching Authority Report for International application No. PCT/US2021/070962.

(Continued)

*Primary Examiner* — Jeong S Park

(57) ABSTRACT

Methods and systems for handling web requests with latency awareness are described herein. A system may receive a web request from a web client, and determine, based on an exponential moving average of past response times, whether to allow the web request to be sent out to the server. Based on this determination, the system may send the web request to the server. The system may receive a response to the web request and update the exponential moving average based on the response time associated with the received response. The response may be forwarded back to the web client.

19 Claims, 14 Drawing Sheets

(56) References Cited

U.S. PATENT DOCUMENTS

| | | | |
|---|---|---|---|
| 2010/0058345 A1* | 3/2010 | Seidman | G06F 11/3466 |
| | | | 718/101 |
| 2010/0241760 A1* | 9/2010 | Zhang | H04L 43/16 |
| | | | 709/235 |
| 2011/0261401 A1* | 10/2011 | Yabe | G06F 3/1247 |
| | | | 358/1.15 |
| 2014/0374483 A1* | 12/2014 | Lu | G06K 7/10009 |
| | | | 235/462.01 |
| 2021/0105317 A1* | 4/2021 | Kona | H04L 43/0876 |

OTHER PUBLICATIONS stackexchange.com, "Algorithm for Dynamic Client Side Throttling" [online], [retrieved on Apr. 12, 2021], Retrieved from the Internet: <https://cs.stackexchange.com/questions/43149/algorithm-for-dynamic-client-side-throttling>, pp. 1-4.

* cited by examiner

| Response Time | Previous EMA | Current EMA | Adjusted EMA | Throttle |
|---|---|---|---|---|
| 200 | 0.0 | 50.0 | 62.5 | OFF |
| 300 | 50.0 | 112.5 | 140.6 | OFF |
| 100 | 112.5 | 109.4 | 136.7 | OFF |
| 30 | 109.4 | 89.5 | 111.9 | OFF |
| 600 | 89.5 | 217.1 | 271.4 | OFF |
| 877 | 217.1 | 382.1 | 477.6 | OFF |
| 1234 | 382.1 | 595.1 | 743.9 | OFF |
| 3000 | 595.1 | 1196.3 | 1495.4 | ON |
| 700 | 1196.3 | 1072.2 | 1340.3 | ON |
| 778 | 1072.2 | 998.7 | 1248.3 | ON |
| 200 | 998.7 | 799.0 | 998.8 | OFF |
| 50 | 799.0 | 611.8 | 764.7 | OFF |
| 80 | 611.8 | 478.8 | 598.5 | OFF |
| 450 | 478.8 | 471.6 | 589.5 | OFF |
| 786 | 471.6 | 550.2 | 687.8 | OFF |
| 12000 | 550.2 | 3412.7 | 4265.8 | ON |
| 1000 | 3412.7 | 2809.5 | 3511.9 | ON |
| 5000 | 2809.5 | 3357.1 | 4196.4 | ON |
| 5000 | 3357.1 | 3767.8 | 4709.8 | ON |
| 7000 | 3767.8 | 4575.9 | 5719.8 | ON |
| 7000 | 4575.9 | 5181.9 | 6477.4 | ON |
| 9000 | 5181.9 | 6136.4 | 7670.5 | ON |
| 20 | 6136.4 | 4607.3 | 5759.2 | ON |
| 50 | 4607.3 | 3468.0 | 4335.0 | ON |
| 400 | 3468.0 | 2701.0 | 3376.2 | ON |
| 200 | 2701.0 | 2075.7 | 2594.7 | ON |
| 200 | 2075.7 | 1606.8 | 2008.5 | ON |
| 200 | 1606.8 | 1255.1 | 1568.9 | ON |
| 200 | 1255.1 | 991.3 | 1239.2 | ON |
| 200 | 991.3 | 793.5 | 991.9 | OFF |
| 200 | 793.5 | 645.1 | 806.4 | OFF |
| 200 | 645.1 | 533.8 | 667.3 | OFF |
| 200 | 533.8 | 450.4 | 563.0 | OFF |
| 1000 | 450.4 | 587.8 | 734.7 | OFF |
| 1000 | 587.8 | 690.8 | 863.5 | OFF |
| 1000 | 690.8 | 768.1 | 960.2 | OFF |
| 1000 | 768.1 | 826.1 | 1032.6 | ON |
| 1000 | 826.1 | 869.6 | 1087.0 | ON |
| 1000 | 869.6 | 902.2 | 1127.7 | ON |
| 1000 | 902.2 | 926.6 | 1158.3 | ON |
| 1000 | 926.6 | 945.0 | 1181.2 | ON |
| 1000 | 945.0 | 958.7 | 1198.4 | ON |
| 1000 | 958.7 | 969.0 | 1211.3 | ON |
| 1000 | 969.0 | 976.8 | 1221.0 | ON |
| 1000 | 976.8 | 982.6 | 1228.2 | ON |

*Smoothing Constant = 0.25, Timeout Value = 1,000 msec

FIG. 9

{FULL_URL, <request URL>} — 1101

{URL_PATH, <regular expression of the part of the URL>} — 1102

{QUERY_STRING, <query string key>} — 1103

{HEADER, <header key>} — 1104

{VERB, <verb value>} — 1105

FIG. 11

WEB CLIENT WITH RESPONSE LATENCY AWARENESS

FIELD

Aspects described herein generally relate to computer networking, web requests, and hardware and software related thereto. More specifically, one or more aspects described herein provide methods and systems for improved web request handlings.

BACKGROUND

The World Wide Web (WWW) technology, built on the Hypertext Transfer Protocol (HTTP), is one of the hallmarks of modern communications on the Internet. In accordance with the HTTP application layer protocol, a client and a server may exchange request and response messages. For example. The client may submit an HTTP request message to the server, and the server may provide resources (e.g., Hypertext Markup Language (HTML) files, photos, videos, etc.) by returning a response message to the client.

However, various adverse network conditions may hinder or prevent the client from receiving a response from the server after sending a request. This not only can decrease the efficiency of communication but can greatly affect the user experience in a negative way as well. Notably, the user may find it unbearable having to wait idly for a response for a long time and may actually prefer receiving immediate feedback even if that meant being served with an error message. Furthermore, the frustrated user may continue to issue multiple requests, which may overwhelm the server thereby further exacerbating the situation. Thus, there exists a need to better manage web requests and responses to improve user experience when the network condition deteriorates.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards improved management of web requests and responses.

In some embodiments, a system may receive, from a web client, a first web request. The system may determine, based on an exponential moving average of a plurality of past response times, whether to allow the first web request. The system may send, based on the determination, the first web request to a server. The system may receive, from the server, a response to the first web request. The system may determine a response time associated with the response. The system may determine, based on the response time and the exponential moving average of the plurality of past response times, an updated exponential moving average. The system may send the response to the web client.

The first web request may be a hypertext transfer protocol (HTTP) request.

Sending the first web request may include initiating a timer, and determining the response time may include calculating the response time based on the timer, and recording the response time.

Determining the updated exponential moving average may be based on the formula, $A_U = (R - A_C) \times C + A_C$, where $A_U$ is the updated exponential moving average, R is the response time, $A_C$ is the exponential moving average of the plurality of past response times, and C is a smoothing constant.

The smoothing constant may be determined based on the formula, $C = 2 \div (N+1)$, where N is a weight value.

The first web request may include an indication of a category associated with the first web request. The plurality of past response times may be associated with the category.

The system may receive, from the web client and after receiving the first web request, a second web request. Based on the updated exponential moving average, the system may determine to disallow the second web request from being sent to the server. The system may send an error response to the web client.

The error response may be hypertext transfer protocol (HTTP) response status code indicating too many requests.

Determining whether to allow the first web request may include: determining to allow the first web request based on the formula, $A_C + (A_C \times C) > T$, being satisfied, where $A_C$ is the exponential moving average of the plurality of past response times, C is a smoothing constant, and T is a timeout value; and/or determining to disallow the first web request based on the formula being not satisfied.

Determining whether to allow the first web request may include determining, among a plurality of exponential moving averages associated with respective categories, the exponential moving average associated with the category.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 9 depicts a table with illustrative web request response times and other related data.

FIG. 11 depicts example category types for managing web requests.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards management of web requests and responses, and throttling requests based on the exponential moving average of past response times. The exponential moving average may be constantly updated based on latest response times and subsequent web requests may be throttled when the exponential moving average becomes too high. Additionally, if the response time exceeds a predetermined timeout value, then the timeout value may be figured into calculating the next exponential moving average.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," "engaged" and similar terms, is meant to include both direct and indirect connecting, coupling, and engaging.

Computing Architecture

Figure 1:
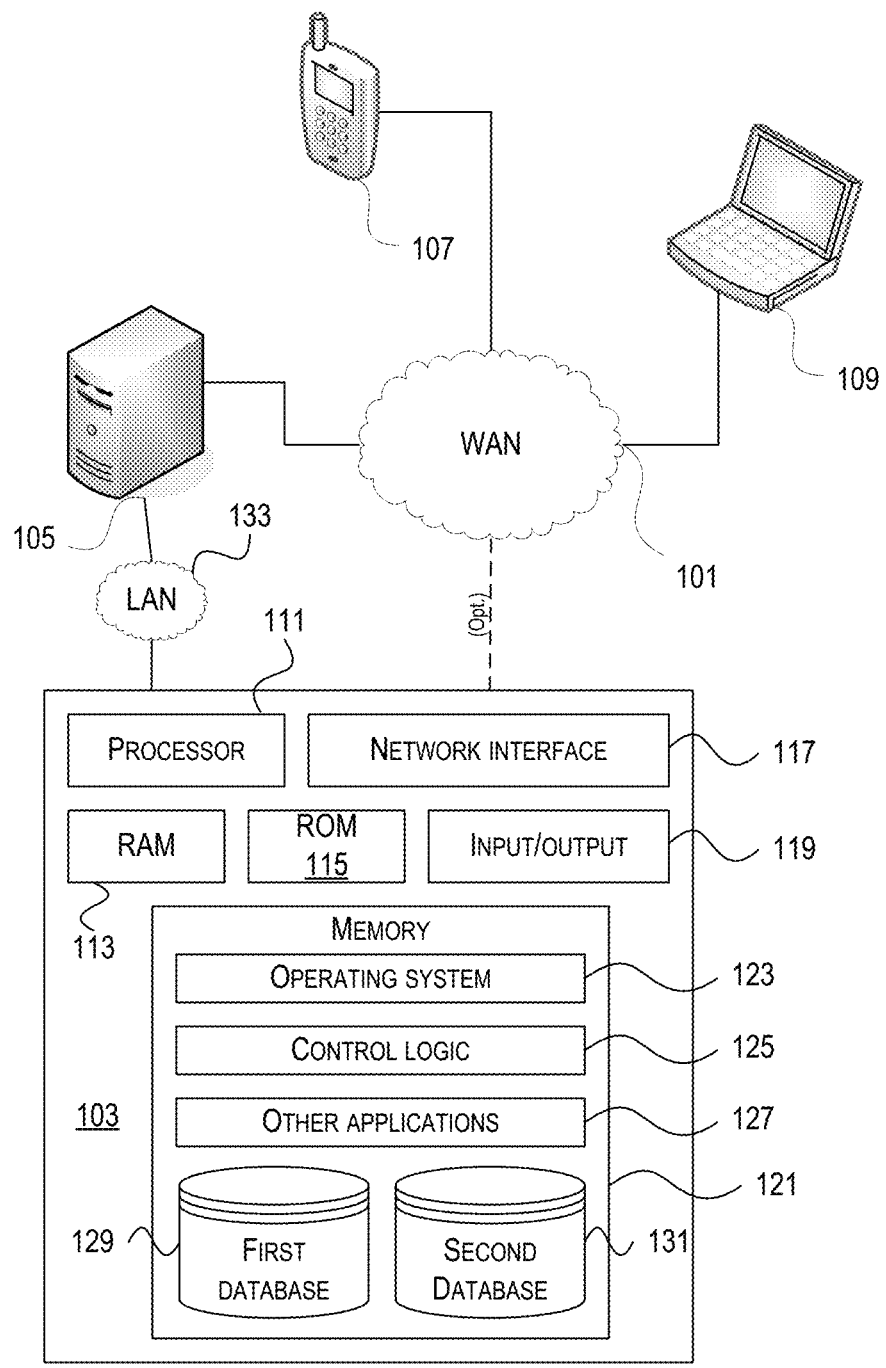
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
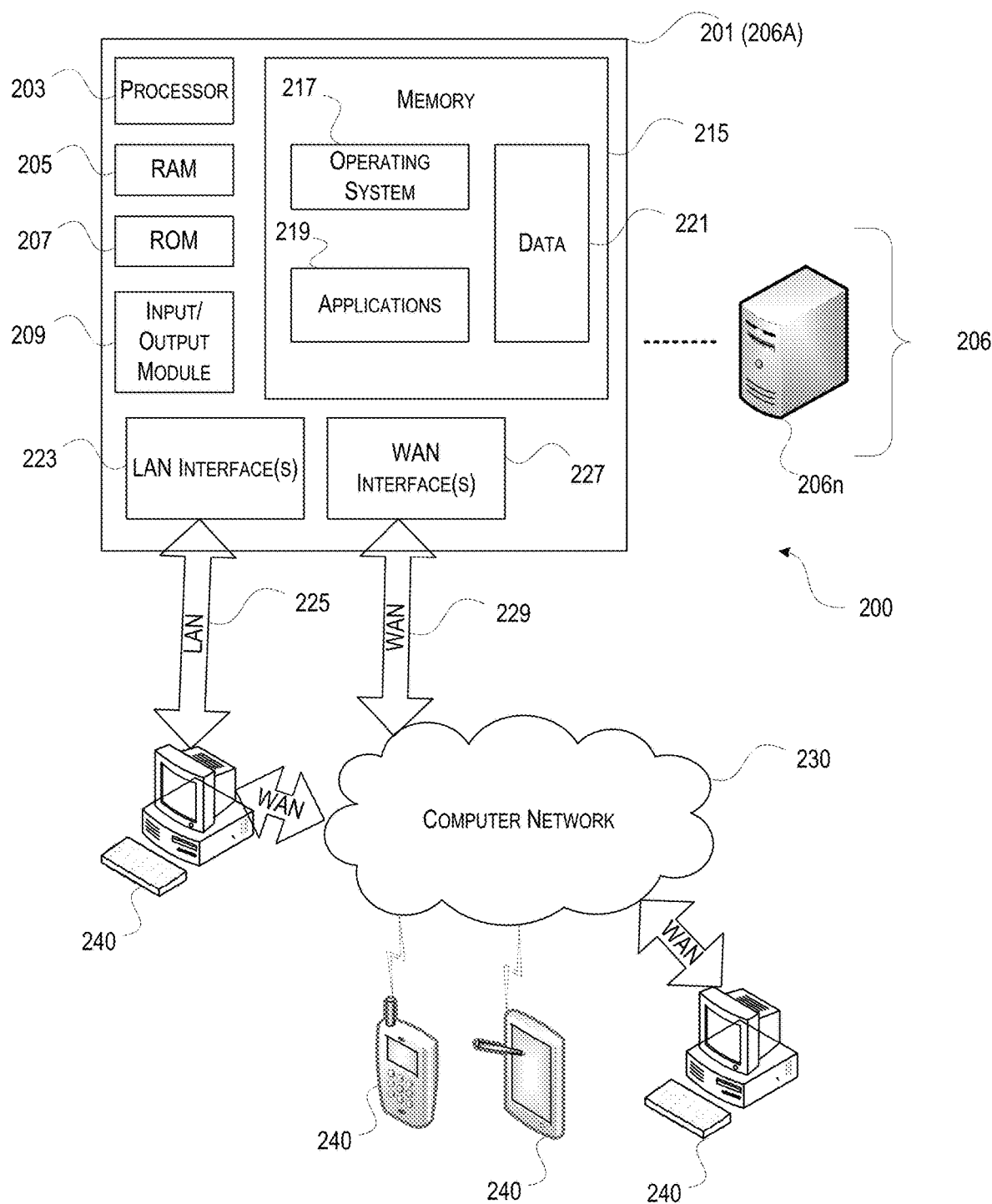
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
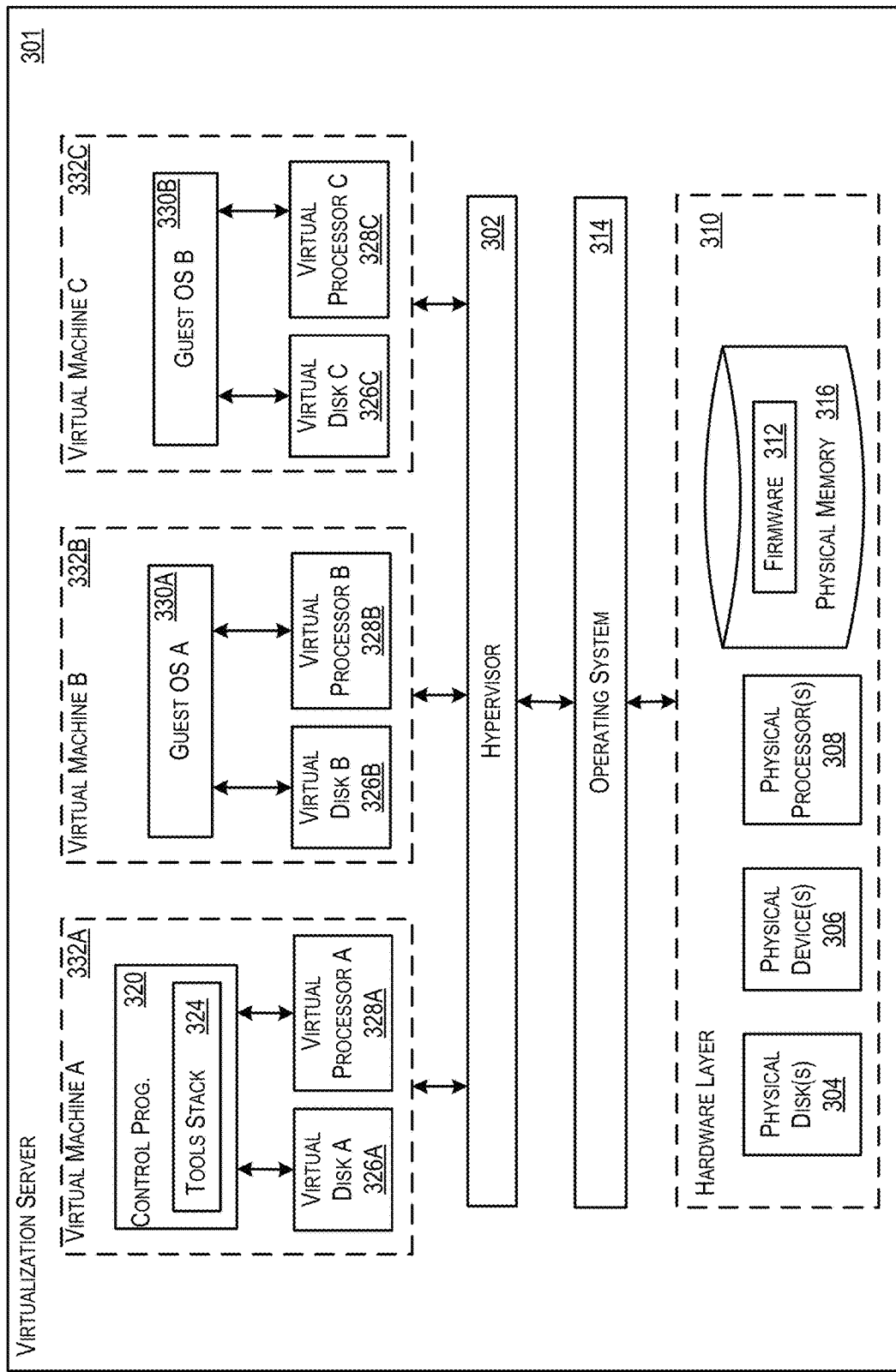
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
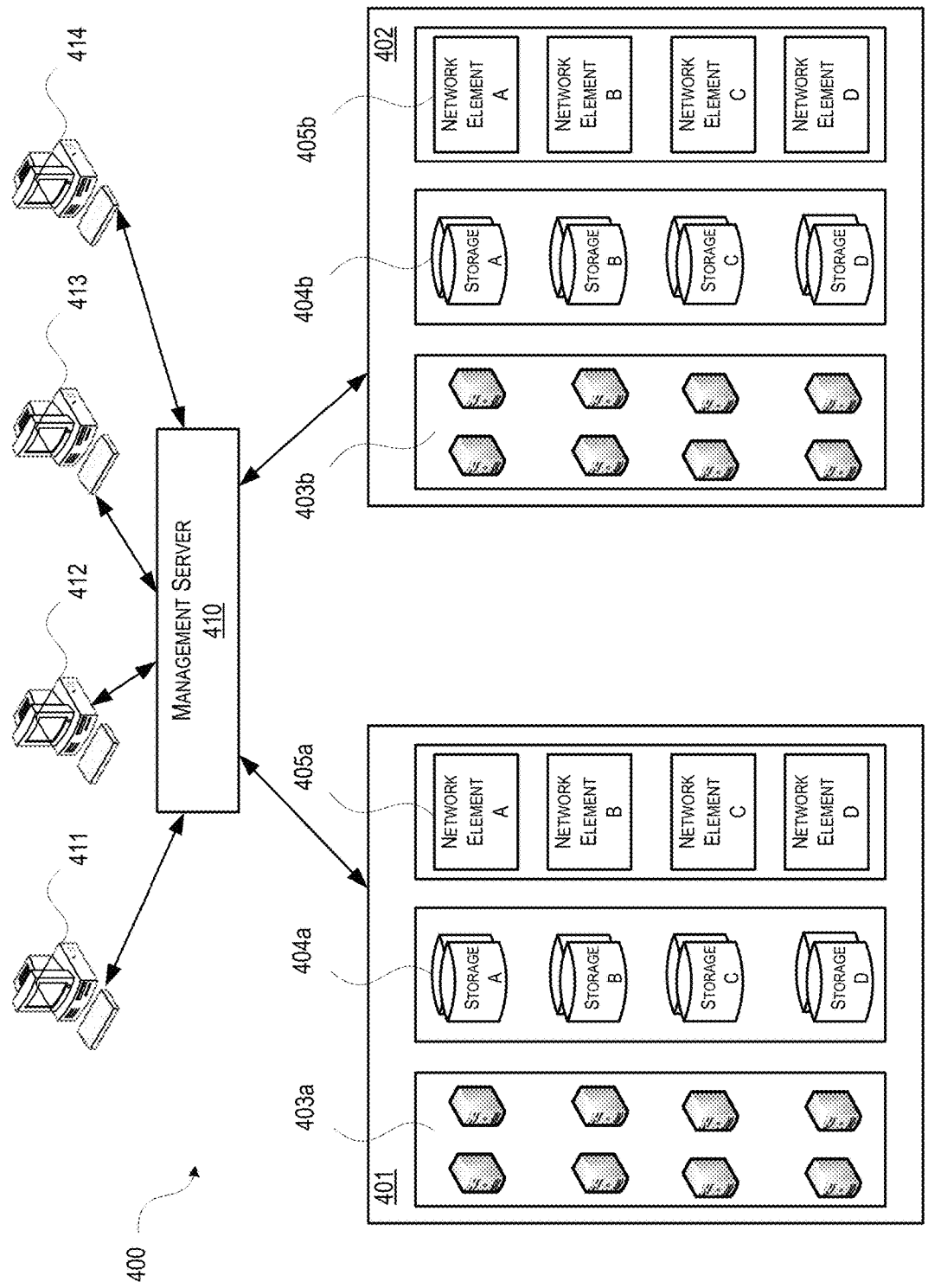
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5:
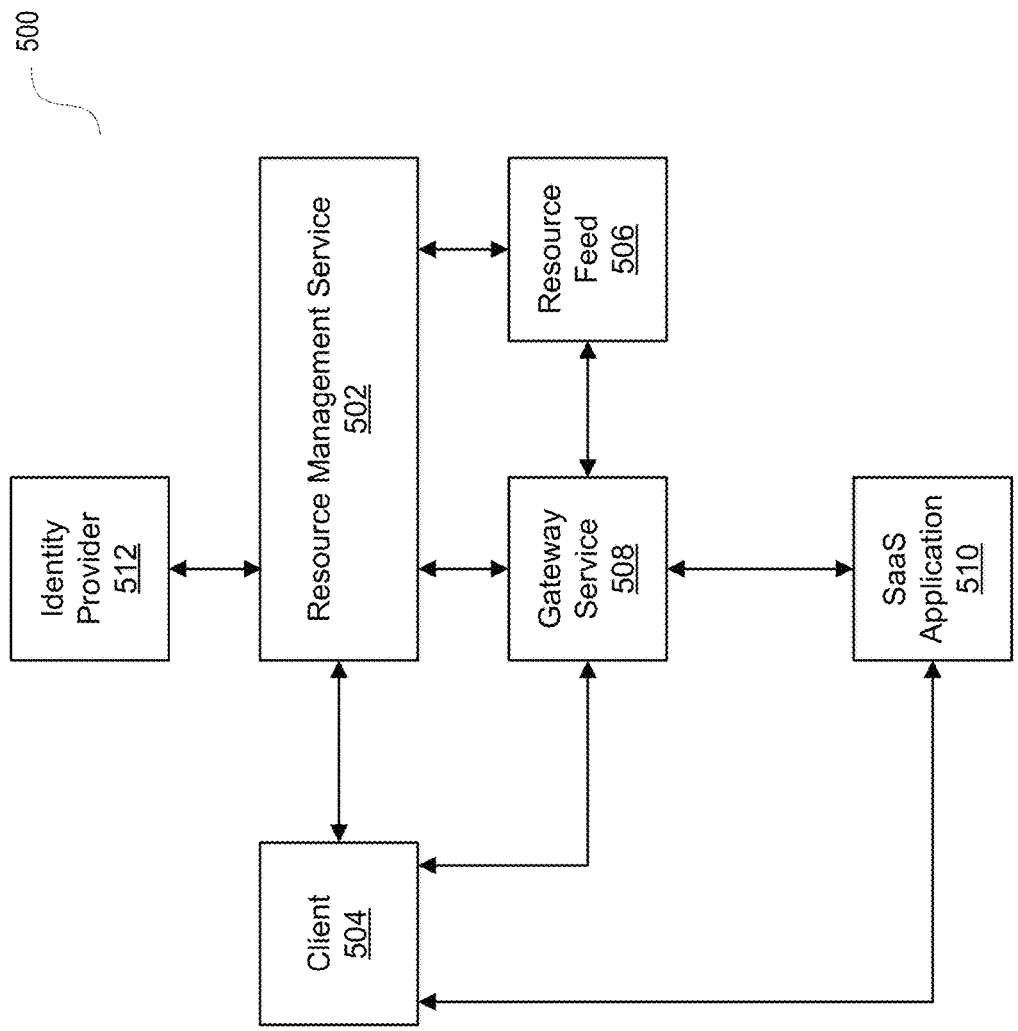
FIG. 5 is a block diagram of an example system, in which a resource management service may manage and streamline access by a client to resource feeds and/or software-as-a-service (SaaS) applications.

FIG. 5 is a block diagram of example system 500 in which one or more resource management services 502 may manage and streamline access by one or more clients 504 to one or more resource feeds 506 (via one or more gateway services 508) and/or one or more software-as-a-service (SaaS) applications 510. In particular, resource management service(s) 502 may employ identity provider 512 to authenticate the identity of a user of client 504 and, following authentication, identify one or more resources the user is authorized to access. In response to the user selecting one of the identified resources, resource management service(s) 502 may send appropriate access credentials to requesting client 504, and client 504 may then use those credentials to access the selected resource. For resource feed(s) 506, client 504 may use the supplied credentials to access the selected resource via gateway service 508. For SaaS application(s) 510, client 504 may use the credentials to access the selected application directly.

Client(s) 504 may be any type of computing devices capable of accessing resource feed(s) 506 and/or the SaaS application(s) 510, and may, for example, include a variety of desktop or laptop computers, smartphones, tablets, etc., including the various devices, terminals, and clients that have been discussed above. Resource feed(s) 506 may include any of numerous resource types and may be provided from any of numerous locations. In some embodiments, for example, resource feed(s) 506 may include one or more systems or services for providing virtual applications and/or desktops to client(s) 504, one or more file repositories and/or file sharing systems, one or more secure browser services, one or more access control services for SaaS applications 510, one or more management services for local applications on client(s) 504, one or more internet enabled devices or sensors, etc. Each of resource management service(s) 502, the resource feed(s) 506, gateway service(s) 508, the SaaS application(s) 510, and identity provider 512 may be located within an on-premises data center of an organization for which system 500 is deployed, within one or more cloud computing environments, or elsewhere.

Figure 6A:
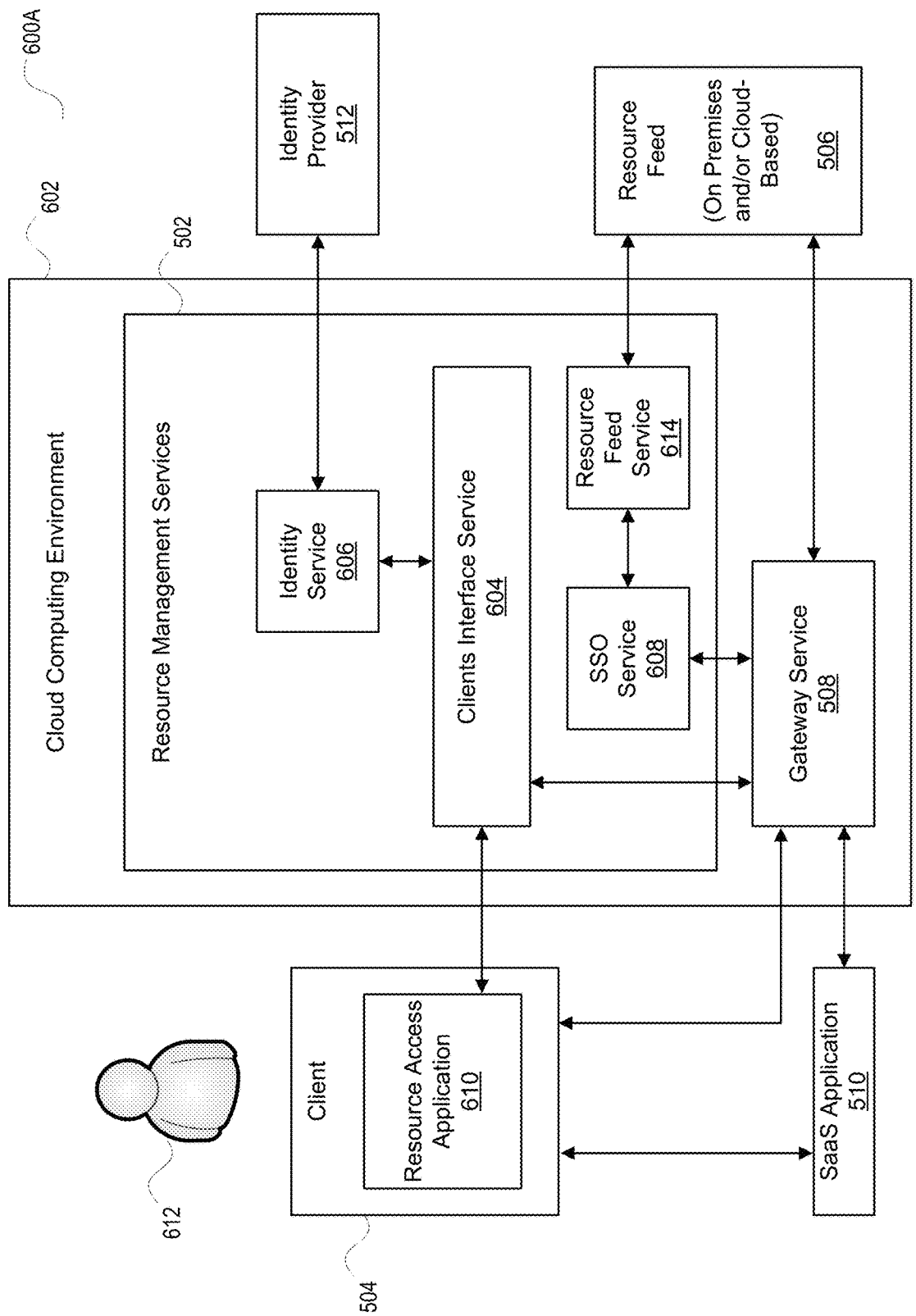
FIG. 6A is a block diagram showing an example implementation, in which various resource management services as well as a gateway service are located within a cloud computing environment.

FIG. 6A is a block diagram showing an example implementation of system 500 shown in FIG. 5, in which various resource management services 502 as well as a gateway service 508 are located within cloud computing environment 602. Cloud computing environment 602 may, for example, include Microsoft Azure Cloud®, Amazon Web Services®, Google Cloud®, or IBM Cloud®.

For any of illustrated components that are not based within the cloud computing environment 602, cloud connectors (not shown) may be used to interface those components with cloud computing environment 602. Such cloud connectors may, for example, run on Windows Server® instances hosted in resource locations and may create a reverse proxy to route traffic between the site(s) and cloud computing environment 602. In the illustrated example, cloud-based resource management services 502 may include client interface service 604, identity service 606, resource feed service 614, and single sign-on (SSO) service 608. As shown, in some embodiments, client 504 may use resource access application 610 to communicate with client interface service 604 as well as to present a user interface on client 504 that user 612 can operate to access resource feed(s) 506 and/or SaaS application(s) 510. Resource access application 610 may either be installed on client 504, or may be executed by client interface service 604 (or elsewhere in system 600A) and accessed using a web browser (not shown in FIG. 6A) on client 504.

As explained in more detail below, in some embodiments, resource access application 610 and associated components may provide user 612 with a personalized, all-in-one interface enabling instant and seamless access to all the user's SaaS and web applications, files, virtual Windows applications, virtual Linux applications, desktops, mobile applications, Citrix Virtual Apps and Desktops®, local applications, and other data.

When resource access application 610 is launched or otherwise accessed by user 612, client interface service 604 may send a sign-on request to identity service 606. In some embodiments, identity provider 512 may be located on the premises of the organization for which system 600A is deployed. Identity provider 512 may, for example, correspond to an on-premises Windows Active Directory®. In such embodiments, identity provider 512 may be connected to cloud-based identity service 606 using a cloud connector (not shown in FIG. 6A), as described above. Upon receiving a sign-on request, identity service 606 may cause resource access application 610 (via client interface service 604) to prompt user 612 for the user's authentication credentials (e.g., user-name and password). Upon receiving the user's authentication credentials, client interface service 604 may pass the credentials along to identity service 606, and identity service 606 may, in turn, forward them to identity provider 512 for authentication, for example, by comparing them against an Active Directory domain. Once identity service 606 receives confirmation from identity provider 512 that the user's identity has been properly authenticated, client interface service 604 may send a request to resource feed service 614 for a list of subscribed resources for user 612.

In other embodiments (not illustrated in FIG. 6A), identity provider 512 may be a cloud-based identity service, such as a Microsoft Azure Active Directory®. In such embodiments, upon receiving a sign-on request from client interface service 604, identity service 606 may, via client interface service 604, cause client 504 to be redirected to the cloud-based identity service to complete an authentication process. The cloud-based identity service may then cause client 504 to prompt user 612 to enter the user's authentication credentials. Upon determining the user's identity has been properly authenticated, the cloud-based identity service may send a message to resource access application 610 indicating the authentication attempt was successful, and resource access application 610 may then inform client interface service 604 of the successfully authentication. Once identity service 606 receives confirmation from client interface service 604 that the user's identity has been properly authenticated, client interface service 604 may send a request to resource feed service 614 for a list of subscribed resources for user 612.

For each configured resource feed, resource feed service 614 may request an identity token from single sign-on service 608. Resource feed service 614 may then pass the feed-specific identity tokens it receives to the points of authentication for respective resource feeds 506. Each resource feed 506 may then respond with a list of resources configured for the respective identity. Resource feed service 614 may then aggregate all items from the different feeds and forward them to client interface service 604, which may cause the resource access application 610 to present a list of available resources on a user interface of client 504. The list of available resources may, for example, be presented on the user interface of client 504 as a set of selectable icons or other elements corresponding to accessible resources. The resources so identified may, for example, include one or more virtual applications and/or desktops (e.g., Citrix Virtual Apps and Desktops®, VMware Horizon®, Microsoft RDS®, etc.), one or more file repositories and/or file sharing systems (e.g., Sharefile®), one or more secure browsers, one or more internet enabled devices or sensors, one or more local applications installed on client 504, and/or one or more SaaS applications 510 to which user 612 has subscribed. The lists of local applications and SaaS applications 510 may, for example, be supplied by resource feeds 506 for respective services that manage which such applications are to be made available to user 612 via resource access application 610. Examples of SaaS applications 510 that may be managed and accessed as described herein include Microsoft Office 365® applications, SAP® SaaS applications, Workday® applications, etc.

For resources other than local applications and SaaS application(s) 510, upon user 612 selecting one of the listed available resources, resource access application 610 may cause client interface service 604 to forward a request for the specified resource to resource feed service 614. In response to receiving such a request, resource feed service 614 may request an identity token for the corresponding feed from single sign-on service 608. Resource feed service 614 may then pass the identity token received from single sign-on service 608 to client interface service 604 where a launch ticket for the resource may be generated and sent to resource access application 610. Upon receiving the launch ticket, resource access application 610 may initiate a secure session to gateway service 508 and present the launch ticket. When gateway service 508 is presented with the launch ticket, it may initiate a secure session to the appropriate resource feed 506 and present the identity token to that feed to seamlessly authenticate user 612. Once the session initializes, client 504 may proceed to access the selected resource.

When user 612 selects a local application, resource access application 610 may cause the selected local application to launch on client 504. When user 612 selects Saas application 510, resource access application 610 may cause client interface service 604 request a one-time uniform resource locator (URL) from gateway service 508 as well as a preferred browser for use in accessing SaaS application 510. After gateway service 508 returns the one-time URL and identifies the preferred browser, client interface service 604 may pass that information along to resource access application 610. Client 504 may then launch the identified browser and initiate a connection to gateway service 508. Gateway service 508 may then request an assertion from single sign-on service 608. Upon receiving the assertion, gateway service 508 may cause the identified browser on client 504 to be redirected to the logon page for identified SaaS application 510 and present the assertion. SaaS application 510 may then contact gateway service 508 to validate the assertion and authenticate user 612. Once user 612 has been authenticated, communication may occur directly between the identified browser and selected SaaS application 510, thus allowing user 612 to use client 504 to access selected SaaS application 510.

In some embodiments, the preferred browser identified by gateway service 508 may be a specialized browser embedded in resource access application 610 (e.g., when resource application is installed on the client 504) or provided by one of resource feeds 506 (e.g., when resource application 610 is located remotely), e.g., via a secure browser service. In such embodiments, SaaS applications 510 may incorporate enhanced security policies to enforce one or more restrictions on the embedded browser. Examples of such policies may include (1) requiring use of the specialized browser and disabling use of other local browsers, (2) restricting clipboard access, e.g., by disabling cut/copy/paste operations between the application and the clipboard, (3) restricting printing (e.g., by disabling the ability to print from within the browser), (4) restricting navigation (e.g., by disabling the next and/or back browser buttons), (5) restricting downloads (e.g., by disabling the ability to download from within SaaS application 510), and (6) displaying watermarks (e.g., by overlaying a screen-based watermark showing the username and IP address associated with client 504 such that the watermark will appear as displayed on the screen if the user tries to print or take a screenshot). Further, in some embodiments, when a user selects a hyperlink within SaaS application 510, the specialized browser may send the URL for the link to an access control service (e.g., implemented as one of resource feed(s) 506) for assessment of its security risk by a web filtering service. For approved URLs, the specialized browser may be permitted to access the link. For suspicious links, however, the web filtering service may have client interface service 604 send the link to a secure browser service, which may start a new virtual browser session with client 504, and thus allow the user to access the potentially harmful linked content in a safe environment.

In some embodiments, in addition to or in lieu of providing user 612 with a list of resources that are available to be accessed individually, as described above, user 612 may instead be permitted to choose to access a streamlined feed of event notifications and/or available actions that may be taken with respect to events that are automatically detected with respect to one or more of the resources. This streamlined resource activity feed, which may be customized for each user 612, may allow users to monitor important activity involving all of their resources-Saas applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 504 to notify user 612 of something that requires the user's attention (e.g., approval of an expense report, new course available for registration, etc.).

Figure 6B:
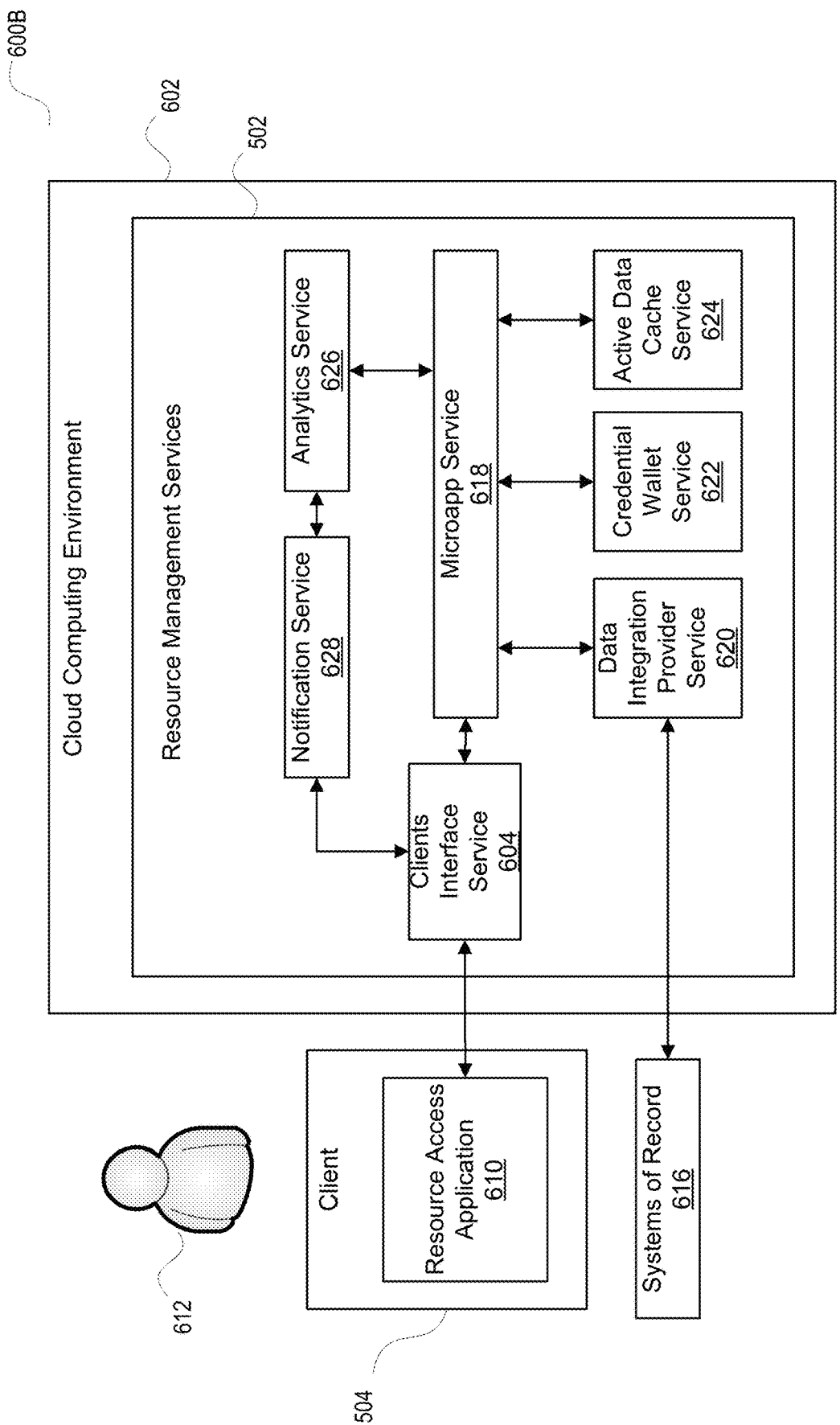
FIG. 6B is a block diagram, in which the available resources are represented by a sin

FIG. 6B is a block diagram similar to that shown in FIG. 6A but in which the available resources (e.g., SaaS applications, web applications, Windows applications, Linux applications, desktops, file repositories and/or file sharing systems, and other data) are represented by a single box 616 labeled "systems of record," and further in which several different services are included within resource management services 502. As explained below, the services shown in FIG. 6B may enable the provision of a streamlined resource activity feed and/or notification process for client 504. In the example shown, in addition to client interface service 604 discussed above, the illustrated services may include microapp service 618, data integration provider service 620, a credential wallet service 622, active data cache service 624, analytics service 626, and notification service 628. In various embodiments, the services shown in system 600B of FIG. 6B may be employed either in addition to or instead of the various services shown in FIG. 6A.

In some embodiments, a microapp may be a single use case app made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 610 without having to launch the native application. The system shown in FIG. 6B may, for example, aggregate relevant notifications, tasks, and insights, and thereby give user 612 a dynamic productivity tool. In some embodiments, the resource activity feed may be intelligently populated by utilizing machine learning and artificial intelligence (AI) algorithms. Further, in some implementations, microapps may be configured within cloud computing environment 602, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 6B, systems of record 616 may represent the applications and/or other resources that resource management services 502 may interact with to create microapps. These resources may be SaaS applications, legacy applications, and/or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 502, and in particular data integration provider service 620, may, for example, support REST API, JSON, OData-JSON, and 6ML. As explained in more detail below, data integration provider service 620 may also write back to the systems of record, for example, using OAuth2 or a service account.

In some embodiments, microapp service 618 may be a single-tenant service responsible for creating the microapps. Microapp service 618 may send raw events, pulled from systems of record 616, to analytics service 626 for processing. Microapp service 618 may, for example, periodically pull active data from systems of record 616.

In some embodiments, active data cache service 624 may be single-tenant and may store all configuration information and microapp data. It may, for example, utilize a pertinent database encryption key and per-tenant database credentials. In some embodiments, credential wallet service 622 may store encrypted service credentials for systems of record 616 and user OAuth2 tokens.

In some embodiments, data integration provider service 620 may interact with systems of record 616 to decrypt end-user credentials and write back actions to systems of record 616 under the identity of the end-user. The write-back actions may, for example, utilize a user's actual account to ensure all actions performed are compliant with data policies of the application or other resource being interacted with.

In some embodiments, analytics service 626 may process the raw events received from microapps service 618 to create targeted scored notifications and send such notifications to notification service 628.

Finally, in some embodiments, notification service 628 may process any notifications it receives from analytics service 626. In some implementations, notification service 628 may store the notifications in a database to be later served in a notification feed. In other embodiments, notification service 628 may additionally or alternatively send the notifications out immediately to client 504 as a push notification to user 612.

In some embodiments, a process for synchronizing with systems of record 616 and generating notifications may operate as follows. Microapp service 618 may retrieve encrypted service account credentials for systems of record 616 from credential wallet service 622 and request a sync with data integration provider service 620. Data integration provider service 620 may then decrypt the service account credentials and use those credentials to retrieve data from systems of record 616. Data integration provider service 620 may then stream the retrieved data to microapp service 618. Microapp service 618 may store the received systems of record data in active data cache service 624 and also send raw events to analytics service 626. Analytics service 626 may create targeted scored notifications and send such notifications to notification service 628. Notification service 628 may store the notifications in a database to be later served in a notification feed and/or may send the notifications out immediately to client 504 as a push notification to user 612.

In some embodiments, a process for processing a user-initiated action via a microapp may operate as follows. Client 504 may receive data from microapp service 618 (via client interface service 604) to render information corresponding to the microapp. Microapp service 618 may receive data from active data cache service 624 to support that rendering. User 612 may invoke an action from the microapp, causing resource access application 610 to send that action to microapp service 618 (via client interface service 604). Microapp service 618 may then retrieve from credential wallet service 622 an encrypted Oauth2 token for the system of record for which the action is to be invoked, and may send the action to data integration provider service 620 together with the encrypted Oauth2 token. Data integration provider service 620 may then decrypt the Oauth2 token and write the action to the appropriate system of record 616 under the identity of user 612. Data integration provider service 620 may then read back changed data from the written-to system of record and send that changed data to microapp service 618. Microapp service 618 may then update active data cache service 624 with the updated data and cause a message to be sent to resource access application 610 (via client interface service 604) notifying user 612 that the action was successfully completed.

In some embodiments, in addition to or in lieu of the functionality described above, resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations. In other embodiments, in addition to or in lieu of the functionality described above, resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 502 may, for example, parse these requests and respond because they are integrated with multiple systems on the back-end. In some embodiments, users may be able to interact with the virtual assistance through either the resource access application 610 or directly from another resource, such as Microsoft Teams®. This feature may allow employees to work efficiently, stay organized, and deliver only the specific information they're looking for.

Web Client with Response Latency Awareness

Figure 7:
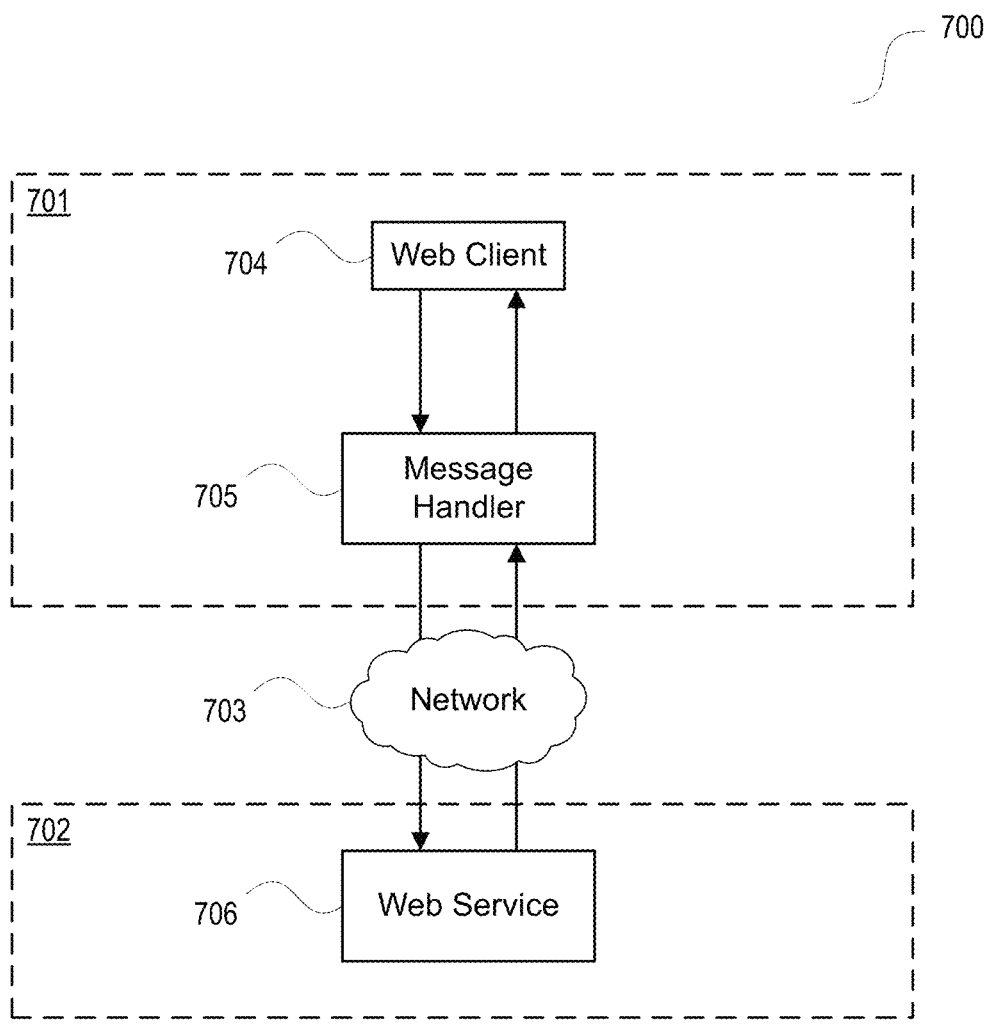
FIG. 7 depicts a block diagram illustrating an example system for making and responding to web requests.

FIG. 7 depicts a block diagram illustrating an example system for making and responding to web requests. According to example system 700, client device 701 may interact with server device 702 (optionally via network 703). Client device 701 may be, for example, any one of the various client devices as described above, such as client devices 105, 107, 109; terminals 240; client computers 411, 412, 413, 414; and/or client 504. Server device 702 may be, for example, any one of the various servicer devices as described above, such as data server 103, web server 105, computing device 201, servers 206, virtualization server 301, cloud management server 410, host servers 403, storage resources 404, network elements 405, resource management service 502, resource feed 506, gateway service 508, identity provider 512, and/or cloud computing environment 602. Although client device 701 and server device 702 are depicted as separate devices in FIG. 7, in some embodiments, client 701 and server 702 may reside within one physical device or within close proximity from each other. Client device 701 and/or server device 702 may be implemented in a virtual machine.

Network 703 may be any type of wired or wireless communication infrastructure that allows client device 701 and server device 702 to exchange control signals and/or data. For example, network 703 may be a local area network (LAN), a virtual local area network (VLAN), a wide area network (WAN), the Internet, etc. Network 703 may support web communications using Hypertext Transfer Protocol (HTTP).

Client device 701 may include web client 704 and message handler 705. One or more components of client device 701 may be implemented with hardware, software, or a combination of both. Web client 704 may be any instance of application that is capable of making web requests. Web client 704 may be an HTTP client. For example, web client 704 may be a web browser, an email client, a calendar application, a social media application, a digital map application, a productivity application, a messaging application, a communications application, a database application, an information retrieval application, a microapp, etc. Web client 704 may be a desktop application or a mobile application. Message handler 705 may be a software and/or hardware module that handles messaging between web client 704 and web service 706 of server device 702. Message handler 705 may be, for example, an HTTP message handler (e.g., of HttpMessageHandler class) on the NET Framework developed by MICROSOFT CORPORATION of Redmond, Wash. Message handler 705 may be capable of performing the exponential moving average (EMA) function as well as storing and recalling EMA values. Web client 704 may use message handler 705 to invoke the make request (e.g., make HTTP request) function to send out a web request to web service 706. In response, message handler may use the EMA function to determine whether or not to throttle the web request. After message handler 705 sends out the web request (e.g., an HTTP request) to web service 706, message handler 705 may receive a web response (e.g., an HTTP response) from web service 706. Based on a timer that was initiated when the web request was sent out, message handler 705 may determine a response time for the web response. The response time may be recorded and an updated EMA value may be determined based on the response time. Message handler 705 may forward an external service response code (e.g., 200 OK, 400 Bad Request, 404 Not Found, etc.) to web client 704. If no response is received by message handler 705 before the timer expires, message handler 705 may return an error code (e.g., 408 Request Timeout) to web client 704.

Server device 702 may include web service 706. Web service 706 may be implemented with hardware, software, or a combination of both. For example, web service 706 may be a web server, an application server, a storage resource, etc. Web service 706 may be an external HTTP service that receives HTTP requests and sends out appropriate HTTP responses.

Figure 8:
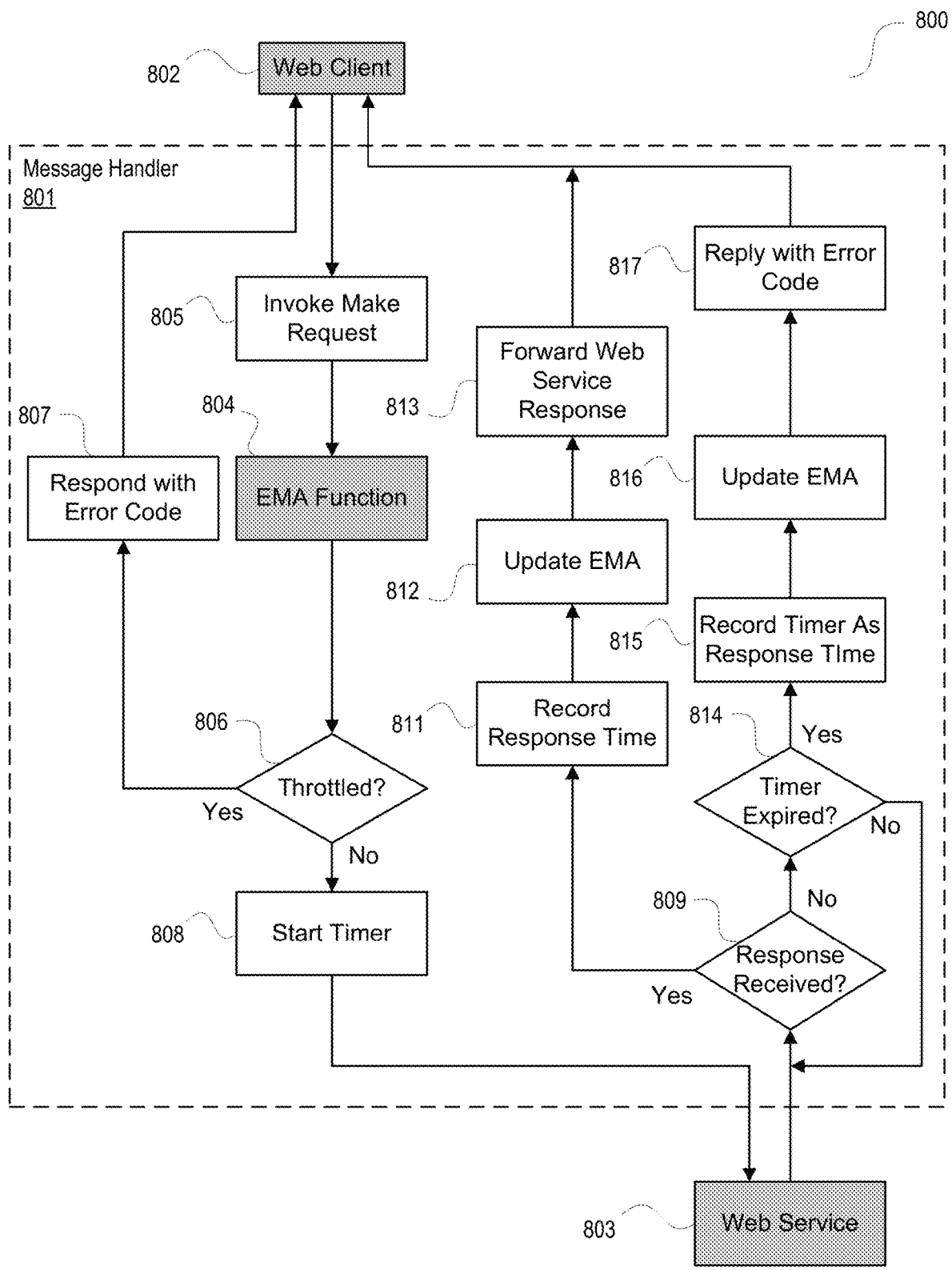
FIG. 8 depicts a block diagram illustrating an example flow of managing web requests with respect to an example system.

FIG. 8 depicts a block diagram illustrating an example flow of managing web requests with respect to an example system. In example system 800, message handler 801 may interact with web client 802 and web service 803 to manage web requests and web request responses. Message handler 801, web client 802, and web service 803 may respectfully correspond to message handler 705, web client 704, and web service 706 as described with reference to FIG. 7. Message handler 801 may further include EMA function 804. EMA function 804 may be implemented with software, hardware, or a combination of both to calculate exponential moving average values of recent web request response times. Although EMA is used as an example of a function for determining an average value throughout this disclosure, other functions may also be used, such as a simple moving average, a cumulative moving average, a weighted moving average, etc. EMA function 804 may be capable of storing a history of response times and/or EMA values. Storage of such values may be done within or outside of EMA function 804, such as in message handler 801, in client device 701, or outside client device 701 (e.g., cloud storage). Although many of the steps shown in FIG. 8 are described as being performed by message handler 801 throughout the present disclosure, other components of a client device (e.g., client device 701) or another device may perform one or more of these steps. For example, all or part of the functionalities of message handler 801 may be integrated into web client 802.

Steps 805 through 808 may represent the outbound flow algorithm of the client. At step 805, web client 802 may send out a web request. For example, message handler 801 may invoke message handler 801 to invoke a make request command. In some embodiments, web client 802 may make a web request via an API call and message handler 801 may receive and/or intercept the call to process it. The web request may be an HTTP request. The web request may include, for example, a Uniform Resource Identifier (URI) or Uniform Resource Locator (URL), an HTTP verb (e.g., GET, HEAD, POST, PUT, DELETE, CONNECT, OPTIONS, TRACE, etc.), an HTTP header having one or more header fields, etc. The web request may also include a parameter specifying how the request is to be categorized. This parameter may be a data reference that allows EMA function 804 to categorize web requests.

At step 806, EMA function 804 may determine whether to throttle the web request. EMA function 804 may access the current EMA of the previous request response times and determine whether or not the web request is to be throttled. For example, determination of whether to throttle the web request may be based on a formula, $A_C+(A_C \times C) > T$, where $A_C$ is the current EMA of past response times, C is a smoothing constant, and T is a timer value. If this formula is satisfied, the web request may be throttled (806—YES). On the other hand, if the formula is not satisfied, the web request may be sent out without being throttled (806—NO). The current EMA may be the latest or updated EMA value that is calculated based on past web request response times. The smoothing constant be a constant value between 0 and 1 that determines how much weight is to be assigned to more recent response time values. Thus, the higher the smoothing constant is (i.e., closer to 1) the greater weight is given to the most recently measured response time value. The smoothing constant value may, for example, be determined by a formula, $C=2 \div (N+1)$, where N represents a weight value. The higher the value of N is, the greater weight will be assigned to older response time values. For example, N may be 7 and C may be 0.25. In another example, N may be 3 and C may be 0.5. The smoothing constant may be determined other formulas. The timer value (also referred to as a timeout value) may be the time threshold within which a response to the web request is expected to arrive. For example, the timer value may be 1,000 milliseconds.

EMA function 804 may keep track of multiple EMA values for different categories of web requests to allow selective web request throttling. For example, it may be possible for message handler 801 to simultaneously allow a first category of web requests (e.g., based on the EMA for the first category) while disallowing (e.g., throttling) a second category of web requests (e.g., based on the EMA for the second category). The categories may be determined based on a full URL, a URL path, a query string, a header, and/or a verb associated with web requests. The categories can be but may not necessarily be mutually exclusive, and a given web request may belong to one or more categories. Message handler 801 may automatically generate new categories based on new web requests being received.

If it is determined that the web request is to be throttled (806—YES), then at step 807, message handler 801 may respond to web client 802 with an error code. The error code may be an HTTP response status code such as HTTP 429 Too Many Requests. Thus, by using EMA function 804, the number of web requests being sent to web service 803 may be scaled back if the current EMA value gets too high. Alternatively, when EMA function 804 determines to throttle web requests, a small percentage of web requests may still be sent out to web service 803 instead of disallowing 100% of all web requests being received from web client 802. For example, depending on the throttling ratio setting (e.g., 5%, 15%, 30%, 50%, 75%, 100%, etc.), message handler 801 may still send out a certain portion of the received web requests to web service 803 instead of responding to web client 802 with an error code every time. As an example, if message handler 801 is set up to reject 80% of web requests when being throttled, one out of every five web requests may be sent to web service 803 even when EMA function 804 determines that web requests are to be throttled.

If it is determined that the web request is not to be throttled (806—NO), message handler 801 may start a timer at step 808 and send the web request to web service 803. The start time of the timer may be stored for later use when a response time is calculated. The timer may be uniquely associated with the web request and/or its associated category. Thus, if multiple web requests are made, multiple independent timers may be initiated to keep track of the multiple requests simultaneously. The web request may be sent to web service 803 via a network, such as network 703 shown in FIG. 7. However, message handler 801 and web service 803 may be located in the same physical or virtual device.

Steps 809 through 817 may represent the inbound flow algorithm of the client. At step 809, message handler 801 may determine whether a web response corresponding to the web request has been received from web service 803 (e.g., from the target URL or URI). The web response may be an HTTP response status code (e.g., 100 Continue, 200 OK, 300 Multiple Choice, 400 Bad Request, 403 Forbidden, 404 Not Found, etc.). If web service 803 has indeed sent a web response in response to the previous web request (809—YES), message handler 801 may record the response time of the web response at step 811. The response time may be determined by subtracting the previously recorded start time of the timer from the current time. In some embodiments, an indication of the category may be recorded together with the response time so that appropriate EMA value(s) corresponding to the category (and only those EMA values) may be updated later. At step 812, the newly recorded response time (e.g., current time−timer start time) may be used to update the EMA value. Thus, the newly updated EMA value may become the new "current" EMA value for the purpose of determining whether to throttle the next web request at step 806. Updating of an EMA value may be performed based on a formula, $A_U=(R-A_C) \times C+A_C$, where $A_U$ is the updated (i.e., new or next) exponential moving average, R is the new response time, $A_C$ is the current (i.e., old or previous) exponential moving average, and C is the smoothing constant as discussed above. In this way, every time a new response time is recorded, a newly updated EMA value may be calculated, and the smoothing constant may determine how far back in time EMA function 804 should take into account when using past response time values. Finally at step 813, message handler 801 may forward the web response received from web service 803 to web client 802.

If a web response is not received at step 809 (809—NO), however, message handler 801 may further determine at step 814 whether the timer has expired. Message handler 801 may calculated the elapsed time since the timer started (e.g., current time−timer start time), and compare the elapsed time against the timer timeout value (e.g., 1,000 milliseconds). If the timer has not expired (e.g., elapsed time<timeout value) (814—NO), then the process may return to step 809 to continue to monitor incoming data traffic from web service 803. If the timer has expired (e.g., elapsed time≥timeout value) (814—YES), then at step 815, message handler 801 may record the timer value (e.g., the timeout value) as the response time associated with the corresponding web request that was sent out to web service 803. In some embodiments, an indication of the category may be recorded together with the response time so that appropriate EMA value(s) corresponding to the category (and only those EMA values) may be updated later. At step 816, the newly recorded response time may be used by EMA function 804 to update its EMA value. Thus, the newly updated EMA value may become the new "current" EMA value for the purpose of determining whether to throttle the next web request at step 806. Similar to step 812, updating of an EMA value may be performed based on the formula, $A_U=(R-A_C) \times C+A_C$, where $A_U$ is the updated (i.e., new or next) exponential moving average, R is the new response time, $A_C$ is the current (i.e., old or previous) exponential moving average, and C is the smoothing constant. At step 817, message handler 801 may reply to web client 802 with an error code. The error code may be an HTTP response status code such as HTTP 408 Request Timeout. Thus, web client 802 may receive an error response (e.g., 408 Request Timeout) more quickly (e.g., when the timer expires) rather than having to wait for a longer time for web service 803 to issue an error response, thereby reducing latency and also reducing the amount of traffic being exchanged between the client and the server.

The various steps shown in FIG. 8 and further described above may be performed in any order, including an order in which one or more steps are modified, omitted or added. For example, the determination of step 814 may be performed prior to or concurrently with the determination of step 809. As another example, the EMA updating steps of 812 and 816 may be performed after steps 813 and 817, respectively, or even after the next web request is received at step 805.

FIG. 9 depicts a table with illustrative web request response times and other related data. Shown in example table 900 are response time 901, previous EMA 902, current EMA 903, adjusted EMA, and throttle status 905. In this particular example, the smoothing constant is set at 0.25, and the timeout value is set at 1,000 milliseconds, but other values may be used. Column 901 of table 900 shows response time values as measured by the client device (e.g., client device 701, message handler 705, message handler 801). Response time 901 represents the amount of time between the transmission of a web request and the receipt of the corresponding web response. Previous EMA 902 represents the exponential moving average that was previously calculated before the corresponding response time 901 was recorded. In other words, a previous EMA 902 value in any given row may be equal to the previous row's current EMA 903 value. Current EMA 903 represents the newly updated EMA value based on the latest response time 901. For example, current EMA 903 may be determined by the formula, $A_C=(R-A_P) \times C+A_P$, where $A_C$ is current (i.e., updated, new, or next) EMA 903, R is response time 901, $A_P$ is previous (i.e., old or previously "current") EMA 902, and C is the smoothing constant (e.g., 0.25).

Adjusted EMA 904 represents the value that is to be compared against the timeout value (e.g., 1,000 msec) for the purpose of determining whether to throttle the next web request. For example, adjusted EMA 904 may be determined by the formula, $A_C+(A_C \times C)$, where $A_C$ is current EMA 903, C is the smoothing constant. By adjusting current EMA 903 based on the smoothing constant, a buffer zone may be created such that the throttle may be preemptively engaged slightly before current EMA 903 actually exceeds the timeout value. Throttle status 905 may represent the result of a determination of whether to throttle the next web request (i.e., "ON") or not throttle the next request (i.e., "OFF"). When the web request is throttled, all or part of future web requests may be disallowed depending on the throttling ratio setting (e.g., 5%, 15%, 30%, 50%, etc.). Throttling of web requests may be determined based on the comparison of adjusted EMA 904 against the timeout value. For example, if EMA 904 is greater than and/or equal to the timeout value, throttle status 905 may be set to "ON." Conversely, if EMA 904 is less than and/or equal to the timeout value, throttle status 905 may be set to "OFF." Alternatively, current EMA 903, instead of adjusted EMA 904, may be compared against the timeout value to determine throttle status 905.

Data such as table 900 may be stored in the client device or in storage outside of the client device. Multiple sets of data may be store on the per-category basis. For example, table 900 may represent response time values (and their associated data) pertaining to one category of web requests may be stored, and a separate set of response time values (and their associated data) pertaining to another category may be also stored.

Figure 10:
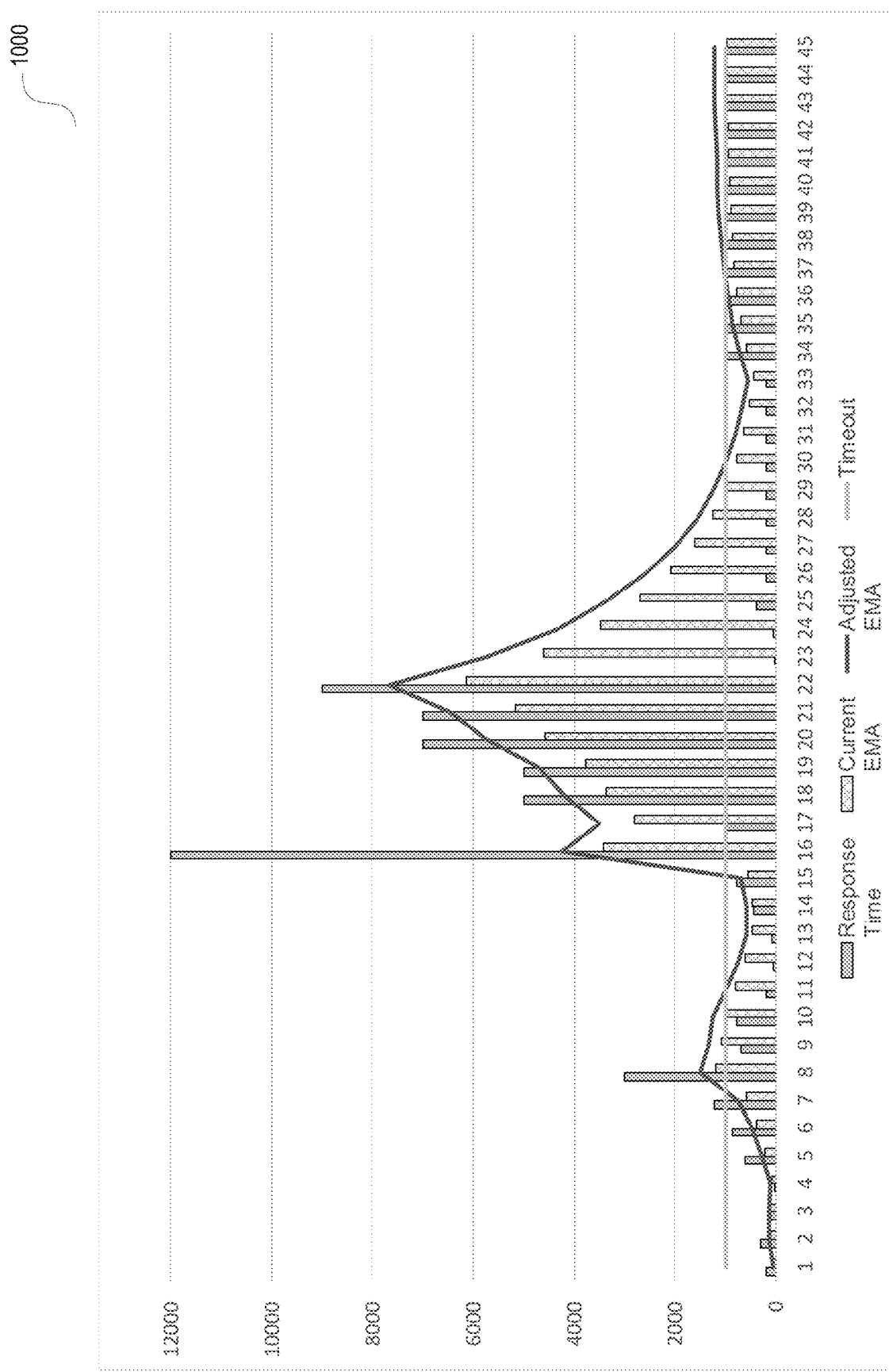
FIG. 10 depicts a graph with illustrative web request response times and other related data.

FIG. 10 depicts a graph with illustrative web request response times and other related data. In particular example graph 1000 corresponds to data shown in table 900 of FIG. 9. In this example, the vertical axis of graph 1000 represents time in milliseconds, and the horizontal axis represents the sequence in which web response times are recorded. While the curved line representing the adjusted EMA is above the horizontal line representing the timeout value, the web requests may be throttled. It may be observed from graph 1000 that the vertical movements of the current EMA values and the adjusted EMA values are more gradual than the rise and fall of raw response time values, and thus the sudden spikes and dips are more smoothed out. Consequently, even when the response time dips below the timeout value of 1,000 milliseconds at sequence number 23 and onward in this example, the throttle may stay on for far longer until sequence number 29.

FIG. 11 depicts example category types for managing web requests. As discussed above, a client device (e.g., a message handler of the client device) may receive, from a web client, a web request and an indication of a category. The EMA function of the message handler may maintain separate sets of response times according to different categories. The EMA function may also maintain separate EMA values according to different categories. Each category may be represented by the unique tuple {CATEGORY, Category Reference}, where CATEGORY is a keyword that indicates a category type, and Category Reference is a parameter that further defines the category. The Category Reference may include a regular expression. The client device may have a database that maps the key {CATEGORY, Category Reference} to the value {current EMA, throttle status}. The category types may be, for example, FULL_URL, URL_PATH, QUERY_STRING, HEADER, VERB, etc. FULL_URL category type 1101 may be a default category type if no category indication is provided with a web request. FULL_URL category type 1101 may be defined by its parameter <request URL>, which is a full URL included in the web request. Some examples of this category type may include {FULL_URL, www.test.com/examplepath/en/home.html?key=1029}, {FULL_URL, http://web.example.com/foo/bar.aspx?search=keyword&index=1114}, {FULL_URL, simpleaddress.net}, etc. URL_PATH category type 1102 may be defined by a partial URL such as a URL path. The parameter may be represented by a regular expression and any URL that matches the regular expression may belong in the corresponding category. Some examples of this category type may include {URL_PATH, (/?[a-z0-9\-._~%!$&'( )*+,;=@]+(/[a-z0-9\-._~%!$&'( )*+,;=@]+)*/?|/)}, {URL_PATH, /path/home.html}, {URL_PATH, (/(path1|path2|path3))+/target(.html?|.php|.aspx)?}, etc.

QUERY_STRING category type 1103 may be defined by its parameter <query string key>, which may assign values to specified parameters in a URL. Some examples of this category type may include {QUERY_STRING, search=}, {QUERY_STRING, q=04160826},{QUERY_STRING, code=04210908?expired=yes}, etc. HEADER category type 1104 may be defined by its parameter <header key>, which is a component of the header section of the web request message. The header key may also be referred to as a header field. Some examples of this category type may include {HEADER, Host}, {HEADER, Accept-Language:(en|sp-|fr|kr)},{HEADER, Cookie}, etc. VERB category type 1105 may be defined by its parameter <verb value>, which indicates a desired action to be performed. The verb is also referred to as a method. Some examples of this category type may include {VERB, GET}, {VERB, PUT}, {VERB, CONNECT}, etc.

Figure 12:
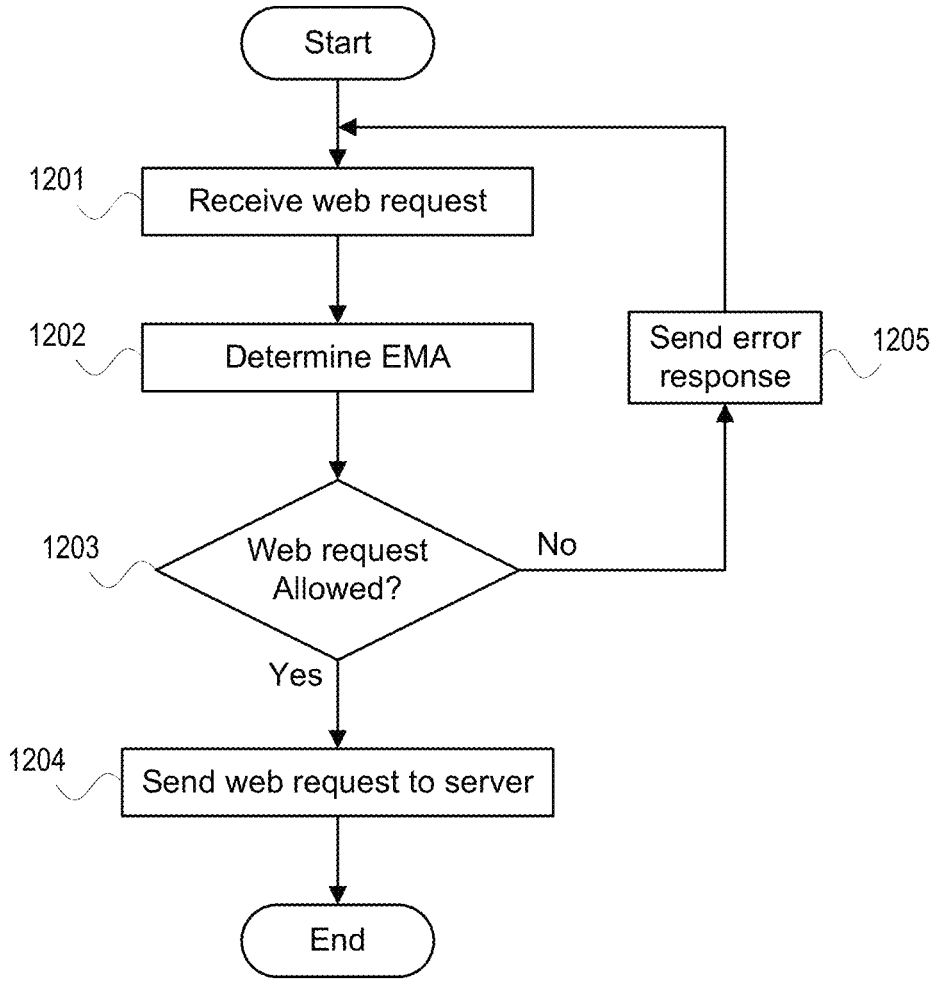
FIG. 12 depicts an outbound flow algorithm of an illustrative method for handling web requests.
Figure 13:
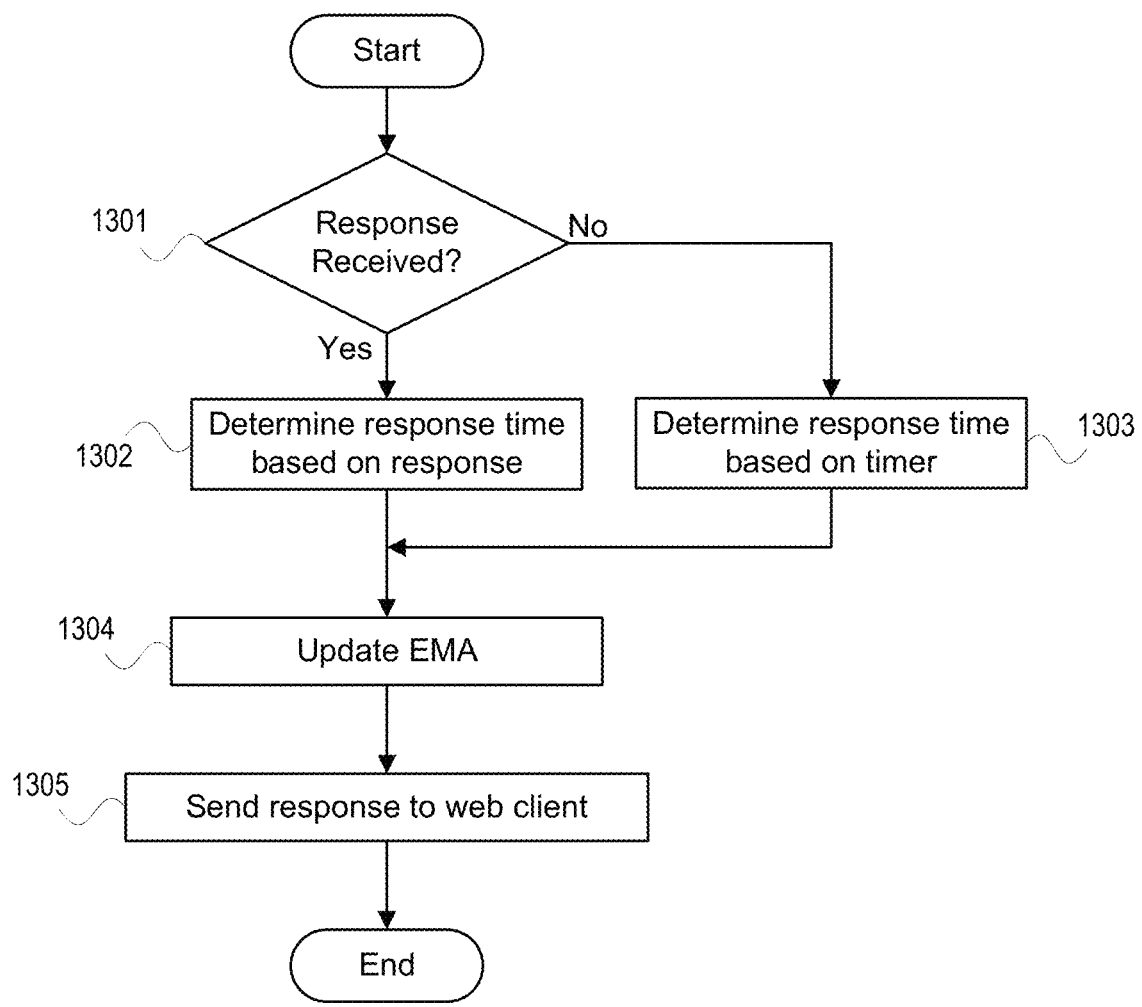
FIG. 13 depicts an inbound flow algorithm of an illustrative method for handling web responses.

Having disclosed some basic system components and concepts, FIGS. 12-13 illustrate methods or algorithms that may be performed to implement various features described herein. For the sake of clarity, the method is described in terms of example system 700 as shown in FIG. 7 configured to practice the method or algorithm. For example, client device 701 and/or message handler 705 may perform the steps disclosed herein. Other devices, including message handler 801 of FIG. 8, may also perform these steps. The steps outlined herein are exemplary and can be implemented in any combination thereof, including combinations that exclude, add, or modify certain steps. The steps can be performed in any order.

FIG. 12 depicts an outbound flow algorithm of an illustrative method for handling web requests. At step, 1201, the system may receive a web request. The web request may be received from a web client. The web request may be an HTTP request. The web request may include an indication of a category associated with the web request. At step 1202, the system may determine an EMA. The determination of the EMA may be based on one or more past web response times. The EMA and the past web response times being referenced may be specific to the category to which the web request belongs. The EMA may be an updated EMA that was calculated based on the most recent response time.

At step 1203, the system may determine whether or not to allow the web request to be sent to the server. The determination may be based on the EMA and a timer timeout value. For example, the throttling determining may be based on the formula, $A_C+(A_C \times C) > T$, where $A_C$ is the EMA of the past response times, C is a smoothing constant, and T is a timeout value. The smoothing constant may be determined based on the formula, $C=2 \div (N+1)$, where N is a weight value. 10. The system may determine an EMA associated with a category to which the request belongs, among multiple EMA values associated with respective categories. If there is not current EMA, then the client device may set the current EMA to 0, create a new key/value entry in the database, and allow the web request by default.

When the throttling formula is satisfied (e.g., $A_C+(A_C \times C) > T$), throttling may be engaged and all or a portion (e.g., according to a throttling ratio) of web requests may be rejected or disallowed from reaching the server (1203—NO), and the system may send an error response to the web client at step 1205 and then wait for the next web request. The error response may be an HTTP response status code indicating too many requests (e.g., HTTP 429 Too Many Requests). Optionally, even when the formula is satisfied and throttling is engaged, a certain percentage (e.g., according to the predetermined throttling ratio) of web requests may still be allowed to be sent (1204—YES). When the formula is not satisfied (e.g., $A_C+(A_C \times C) \leq T$), throttling is disengaged and the web request may be allowed to be sent (1203—YES). At step 1204, based on the determination to allow the web request, the system may send the web request to the server. The server may be a web server. The web request may be sent to the server via a network such as the Internet. When the web request is sent, a timer may be initiated. The start time of the timer may be recorded such that it may be used later to calculate a response time.

FIG. 13 depicts an inbound flow algorithm of an illustrative method for handling web responses. At step 1301, the system may determine whether or not a response to the web request has been received. Specifically, the system may determine whether or not a response to the web request has been received from the server before the timer expired (e.g., timer value>timeout value). The response may be a web response (e.g., an HTTP response) from the server. If the response is received before the timer expires (1301—YES), then at step 1302, the system may determine a response time based on the received response. Specifically, the system may calculate the response time by subtracting the timer start time value from the time of the response's receipt. The system may store (e.g., record) the resulting value as the response time associated with the response. If, on the other hand, the time expires before receiving a response from the server (1301—NO), then at step 1303, the system may determine the response time based on the timer. For example, the system may record the timeout value as the response time.

At step 1304, the system may update the EMA. Specifically, the system may determine the updated EMA based on the response time and the current EMA of previous response times based on the formula, $A_U=(R-A_C)\times C+A_C$, where $A_U$ is the updated EMA, R is the response time, $A_C$ is the current EMA, and C is the smoothing constant. The updated EMA may be stored in the database with a matching key (e.g., {CATEGORY, Category Reference}). The smoothing constant may be determined based on the formula, $C=2\div(N+1)$, where N is a weight value. The response time R may be an actual response time based on the received response or the timeout value after the timer expires without receiving a response. The updated EMA may be used to determine whether or not to allow the next web request. If a matching key (e.g., {CATEGORY, Category Reference}) does not exist in the database, the system may create a new key/value entry in the database, set the response time as the current EMA, then disengage throttling. At step 1305, the system may send a response to the web client. The response may be the same response (e.g., web response) received from the server, or it may be an error code (e.g., an HTTP response status code) indicating request timeout (e.g., HTTP 408 Request Timeout) in case the response was never received before the timer expired.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, from a web client at a client device, a first web request;
determining, at the client device, based on an exponential moving average of a plurality of past response times, whether to allow the first web request, wherein an error response is sent to the web client directly from the client device when the first web request is not allowed, wherein the determining the updated exponential moving average is based on a formula, $A_U=(R-A_C)\times C+A_C$, and wherein $A_U$ is the updated exponential moving average, R is the response time, $A_C$ is the exponential moving average of the plurality of past response times, and C is a smoothing constant;
sending, based on the determination, the first web request from the client device to a server;
receiving, at the client device, from the server, a response to the first web request;
determining, at the client device, a response time associated with the response;
determining, at the client device, based on the response time and the exponential moving average of the plurality of past response times, an updated exponential moving average; and
sending the response to the web client at the client device.

2. The method of claim 1, wherein the first web request comprises a hypertext transfer protocol (HTTP) request.

3. The method of claim 1, wherein the sending the first web request comprises initiating a timer, and
wherein the determining the response time comprises:
calculating the response time based on the timer, wherein the timer comprises a timeout value; and
recording the response time.

4. The method of claim 3, wherein calculating the response time based on the timer comprises:
calculating an elapsed time from a timer start time; and
comparing the elapsed time to the timer timeout value, wherein the timer timeout value is considered as the response time if the elapsed time is more than the timer timeout time.

5. The method of claim 1, wherein the smoothing constant is based on a formula, $C=2\div(N+1)$, and wherein N is a weight value.

6. The method of claim 1, wherein the first web request comprises an indication of a category associated with the first web request, and wherein the plurality of past response times are associated with the category.

7. The method of claim 1, further comprising:
receiving, from the web client and after receiving the first web request, a second web request;
based on the updated exponential moving average, determining at the client device to disallow the second web request from being sent from the web client to the server; and
sending an error response to the web client.

8. The method of claim 7, wherein the error response comprises a hypertext transfer protocol (HTTP) response status code indicating too many requests.

9. The method of claim 1, wherein the determining whether to allow the first web request comprises at least one of:
determining to allow the first web request based on a formula, $A_C+(A_C\times C)>T$, being satisfied, wherein $A_C$ is the exponential moving average of the plurality of past response times, C is a smoothing constant, and T is a timeout value, or
determining to disallow the first web request based on the formula being not satisfied.

10. The method of claim 1, wherein the determining whether to allow the first web request comprises determining, among a plurality of exponential moving averages associated with respective categories, the exponential moving average associated with the category.

11. The method of claim 1, wherein the updated exponential moving average is a current exponential moving average.

12. An apparatus comprising:
one or more processors; and
memory storing instructions that, when executed by the one or more processors, cause the apparatus to:
receive, from a web client at the apparatus, a first web request;
determine, based on an exponential moving average of a plurality of past response times, whether to allow the first web request, wherein an error response is sent to the web client directly from the apparatus when the first web request is not allowed, wherein the determining the updated exponential moving average is based on a formula, $A_U=(R-A_C)\times C+A_C$, and wherein $A_U$ is the updated exponential moving average, R is the response time, $A_C$ is the exponential moving average of the plurality of past response times, and C is a smoothing constant;

send, based on the determination, the first web request to a server;

receive, from the server, a response to the first web request;

determine a response time associated with the response;

determine, based on the response time and the exponential moving average of the plurality of past response times, an updated exponential moving average; and send the response to the web client.

13. The apparatus of claim 12, wherein the first web request comprises a hypertext transfer protocol (HTTP) request.

14. The apparatus of claim 12, wherein the smoothing constant is based on a formula, $C=2\div(N+1)$, and wherein N is a weight value.

15. The apparatus of claim 12, wherein the instructions, when executed by the one or more processors, cause the apparatus to determine whether to allow the first web request by performing at least one of:

determining to allow the first web request based on a formula, $A_C+(A_C\times C)>T$, being satisfied, wherein $A_C$ is the exponential moving average of the plurality of past response times, C is a smoothing constant, and T is a timeout value, or determining to disallow the first web request based on the formula being not satisfied.

16. A non-transitory computer-readable medium storing instructions that, when executed, cause:

receiving, from a web client at a client device, a first web request;

determining, at the client device, based on an exponential moving average of a plurality of past response times, whether to allow the first web request, wherein an error response is sent to the web client directly from the client device when the first web request is not allowed, wherein the determining the updated exponential moving average is based on a formula, $A_U=(R-A_C)\times C+A_C$, and wherein $A_U$ is the updated exponential moving average, R is the response time, $A_C$ is the exponential moving average of the plurality of past response times, and C is a smoothing constant;

sending, based on the determination, the first web request from the client device to a server;

receiving, at the client device from the server, a response to the first web request;

determining, at the client device, a response time associated with the response;

determining, at the client device, based on the response time and the exponential moving average of the plurality of past response times, an updated exponential moving average; and sending the response to the web client at the client device.

17. The non-transitory computer-readable medium of claim 16, wherein the first web request comprises a hypertext transfer protocol (HTTP) request.

18. The non-transitory computer-readable medium of claim 16, wherein the smoothing constant is based on a formula, $C=2\div(N+1)$, and wherein N is a weight value.

19. The non-transitory computer-readable medium of claim 16, wherein the instructions, when executed, cause the determining whether to allow the first web request by performing at least one of:

determining to allow the first web request based on a formula, $A_C+(A_C\times C)>T$, being satisfied, wherein $A_C$ is the exponential moving average of the plurality of past response times, C is a smoothing constant, and T is a timeout value, or determining to disallow the first web request based on the formula being not satisfied.

* * * * *